United States Patent Office 3,229,167
Patented Jan. 11, 1966

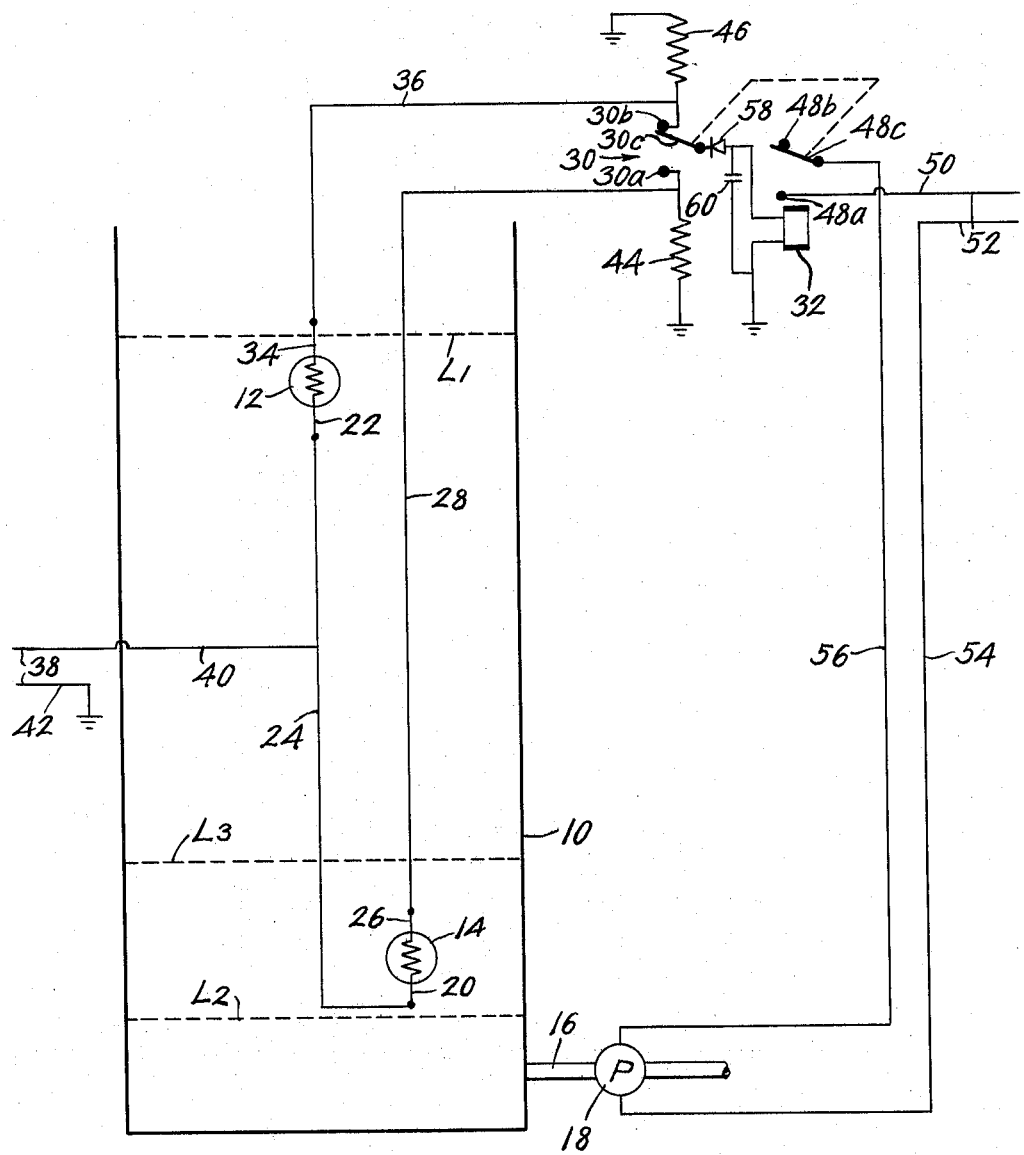

3,229,167
FLUID LEVEL CONTROL SYSTEM
Ralph W. Goble, Boulder, Colo., assignor to Engineering
& Development Company of Colorado, Boulder, Colo.,
a corporation of Colorado
Filed Jan. 14, 1963, Ser. No. 251,134
9 Claims. (Cl. 317—132)

This invention relates to a system for the control of fluid level and, more particularly, to such system including novel means for sensing fluid level and adapted to effect the control thereof.

Numerous attempts have been made in the past to develop a system for the control of liquid level which would provide positive level control under all conditions and be economical of construction. Until the present invention, these attempts have not been entirely successful.

It is a principal object of the present invention to provide an improved fluid level control system which overcomes the disadvantages of prior systems and is fail-safe.

A further object of the present invention is to provide an improved fluid level control system which is inexpensive to manufacture and utilizes standard components in its construction.

For a better understanding of the present invention, together with other and further objects thereof, reference is had to the following description taken in connection with the accompanying drawing and its scope will be pointed out in the appended claims.

In the drawing, the sole figure is a circuit diagram, partly schematic, of an embodiment of the fluid level control system of the invention.

Referring to the figure, a vessel or fluid container is represented by the reference numeral 10. Appropriately positioned within container 10 are thermistors 12 and 14, each being of the positive temperature coefficient type, i.e., as the temperature of a thermistor increases the ohmic value of electrical resistance thereof increases. Thermistor 12 is positioned within container 10 to be just below the upper limit of fluid level $L_1$, shown dotted, and thermistor 14 is positioned within container 10 to be just above the lower limit of fluid level $L_2$, shown dotted. An intermediate fluid level falling between $L_1$ and $L_2$ is identified as $L_3$. The container 10 is provided with an exhaust conduit 16 communicating therewith below fluid level $L_2$ and includes a pump 18 for exhausting the fluid contents of container 10. It will be appreciated that pump 18 could be replaced with an electrically actuated valve where positive pumping is not permissible or desirable.

One terminal 20 of thermistor 14 is electrically connected to one terminal 22 by means of conductor 24. The other terminal 26 of thermistor 14 is connected by means of conductor 28 to pole 30a of relay actuated switch 30. The other terminal 34 of thermistor 12 is connected by means of conductor 36 to pole 30b of switch 30.

One side of a current source 38 is connected to conductor 24 intermediate thermistors 12 and 14 by means of conductor 40. The other side of current source 38 is shown connected to a ground connection by conductor 42.

A load resistance 44 of suitable value is connected between pole 30a of switch 30 and ground and a load resistance 46 of suitable value is connected between pole 30b and ground. The relay actuated armature 30c of switch 30 is connected through relay coil 32 to ground and armature 30c is normally closed with pole 30b with relay coil 32 unactivated.

Switch 30 may be termed the control switch and a second relay actuated switch 48 will be termed the controlled switch. Switch 48 includes normally open pole 48a, normally closed pole 48b and armature 48c also responsive to the energization of relay coil 32. Pole 48a is connected by conductor 50 to one side of a source of current 52 which may be the same or different from current source 38. The other side of current source 52 is connected through conductor 54 to one terminal of an electric motor forming a part of pump 18 and adapted to drive same. The other terminal of the motor of pump 18 is connected to armature 48c via conductor 56.

It will be appreciated that thermistors will be vertically spaced apart by a distance substantially equal to the extremities of the fluid levels to be controlled. With the fluid level as at $L_1$, thermistors 12 and 14 will be cooled thereby and present a low resistance path from current source 38 through conductors 40, 24, thermistors 12 and 14, conductors 28 and 36 and through resistors 44 and 46 to ground and thence through conductor 42 back to source 38. The resistance value of load resistors 44 and 46 is chosen such that when either thermistor 12 or 14 is in the low resistance condition, a sufficient voltage drop is experienced across these resistors to cause the actuation of armatures 30c and 48c of switches 30 and 48 to make contact with poles 30a and 48a respectively. The closure of armature 48c with pole 48a completes the current path from current source 52 through conductor 50, pole 48a, armature 48c, conductor 56, through the motor of pump 18, and conductor 54 energizing pump 18. Pump 18 pumps fluid out of container 10 via conduit 16 and the fluid level falls. As the fluid level falls below the thermistor 12 into the vicinity of level $L_3$, the current flowing through resistor 46 causes thermistor 12 to heat up, increasing its resistance. Since thermistor 14 is still immersed in fluid and presents a low resistance path, the current flow is principally through load resistor 44 and a sufficient voltage drop appears thereacross to maintain relay coil 32 in activated condition.

With relay coil 32 activated, pump 18 continues to exhaust fluid from container 10 until the fluid level falls below thermistor 14 in the vicinity of level $L_2$. Since thermistor 14 is no longer immersed in fluid, the current flow therethrough causes the thermistor to heat up, producing a high resistance path to load resistor 44, reducing the voltage drop thereacross to a value insufficient to maintain relay coil 32 activated, whereupon armatures 30c and 48c revert to their normal positions in contact with poles 30b and 48b respectively. The motor of pump 18 is de-energized and the flow of fluid from container 10 ceases.

As fluid again accumulates in container 10, the liquid level rises and when the fluid level rises above thermistor 14 as at $L_3$, thermistor 14 again presents a low resistance path to resistor 44. However, armature 30c is now in the normal condition in contact with pole 30b and coil 32 remains unenergized. When the fluid level rises above thermistor 12, to say level $L_1$, it is cooled presenting a low resistance path to resistor 46, developing a sufficient voltage drop thereacross to energize relay coil 32, switch pump 18 into the circuit and the cycle is repeated.

In contrast to fluid level control systems which would utilize negative temperature coefficient thermistors, the system of the present invention does not require the inclusion of expensive current limiting devices to prevent a current runaway. Further, a system using negative temperature coefficient thermistors, would interpret a thermistor failure as an infinitely high resistance keeping the pump operating continuously with resultant damage to the pump being run dry. Damage to the motor would also result from such continuous duty operation or a more expensive motor would be required as a precautionary measure.

In the instant invention, the opening of either thermistor 12 or 14, or both, will prevent the activation or de-activate relay coil 32, and the motor of pump 18 will cease to be further activated providing a fail-safe system. The present system thus prevents the pump from being run dry which can be injurious thereto. Further, where a submersible pump is used and the fluid provides the necessary cooling to the motor, the present system prevents motor burn-out if a component fails.

Where chatter of armatures 30c and 48c is objectionable, coil 32 can be supplied with a D.C. current by placing a rectifier 58 in series with coil 32 and a smoothing condenser 60 in parallel therewith.

While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is.

1. An electric circuit for the control of an electric device as a function of fluid level over a predetermined range of fluid levels which comprises a pair of vertically spaced sensing means adapted to provide a relatively low resistance electrical path when immersed in a fluid and a relatively high resistance electrical path when not so immersed, a control means, circuit establishing and opening means operable to energize the control means, said circuit establishing and opening means being energized from a current source through the upper sensing means while same is in a low resistance condition, to maintain the control means energized through the lower sensing means while same is in a low resistance condition and de-energize the control means when the lower sensing means is in a high resistance condition.

2. An electric circuit according to claim 1, wherein the circuit establishing and opening means comprises a relay which includes a double pole single pole switch having one pole normally open and one normally closed with the relay armature connected through the actuating coil of the relay to a source of current, the upper sensing means being adapted to complete a circuit through said actuating coil from a current source via the normally closed pole to energize said coil and the lower sensing means being adapted to complete a circuit through said actuating coil from a current source via the normally open pole to maintain said coil energized.

3. The circuit of claim 2 wherein the control means includes a normally open switch means adapted to close when the relay coil is energized completing a circuit from a source of current through an electrical device to be controlled.

4. The circuit of claim 2 wherein the sensing means comprise positive temperature coefficient thermistors.

5. In a fluid level control system the combination of a pair of level sensing means of the type adapted to provide a relatively low resistance electrical path when immersed in a liquid and a relatively high resistance when not so immersed, resistance means serially connnected to each sensing means with said sensing means and said series resistance means being adapted to be connected across a source of current, and relay means including a double pole switch, with one pole thereof being connected to the juncture of one sensing means and its serially connected resistance means and the other pole connected to the juncture of the other sensing means and its serially connected resistance means, said relay means having an armature means connected through an actuating coil of the relay to one side of a current source and adapted to be selectively connected to the other side of a current source through a pole of the switch and a sensing means, said relay having a further set of switch contacts adapted to be closed when the actuating coil of the relay is energized.

6. The combination of claim 5 wherein the resistance means are of relatively high resistance compared to the resistance of the sensing means when immersed in a fluid.

7. The combination of claim 5 wherein the sensing means are vertically spaced apart by a distance substantially equal to the range of fluid level to be controlled.

8. The combination of claim 5 wherein the sensing means consist of positive temperature coefficient thermistors.

9. The combination of claim 7 wherein the double pole switch has one pole normally closed and the upper most sensing means is connected to the normally closed pole.

References Cited by the Examiner

UNITED STATES PATENTS

| 2,266,146 | 12/1941 | Biebel | 317—132 |
| 2,266,248 | 12/1941 | Osterheld | 317—132 |
| 2,266,249 | 12/1941 | Osterheld | 317—132 |
| 2,266,250 | 12/1941 | Osterheld | 317—132 |
| 2,766,406 | 10/1956 | Schwarzkopf | 317—132 |
| 2,769,121 | 10/1956 | Rogoff | 317—132 |

SAMUEL BERNSTEIN, *Primary Examiner.*